(12) United States Patent
Biel et al.

(10) Patent No.: US 9,840,047 B2
(45) Date of Patent: Dec. 12, 2017

(54) APPARATUS AND METHOD FOR TRANSPORTING CONTACT LENSES THROUGH DIPPING BATHS

(71) Applicant: Novartis AG, Basel (CH)

(72) Inventors: Roger Biel, Aschaffenburg (DE); Katrin Sylke Struckmeier, Aschaffenburg (DE); Adrian Michael Woodward, Suffolk (GB); Stephen George Fleck, Cambridge (GB)

(73) Assignee: NOVARTIS AG, Basel (CH)

( * ) Notice: Subject to any disclaimer, the term of this patent is extended or adjusted under 35 U.S.C. 154(b) by 356 days.

(21) Appl. No.: 14/678,264

(22) Filed: Apr. 3, 2015

(65) Prior Publication Data

US 2015/0209819 A1 Jul. 30, 2015

Related U.S. Application Data

(62) Division of application No. 12/904,179, filed on Oct. 14, 2010, now Pat. No. 9,108,368.

(Continued)

(51) Int. Cl.
*B05C 13/02* (2006.01)
*B29D 11/00* (2006.01)
(Continued)

(52) U.S. Cl.
CPC .......... *B29D 11/00125* (2013.01); *B05C 3/10* (2013.01); *B05C 13/02* (2013.01); *B05D 1/18* (2013.01)

(58) Field of Classification Search
None
See application file for complete search history.

(56) References Cited

U.S. PATENT DOCUMENTS 1,974,890 A * 9/1934 Long .................... G03D 3/04
396/621
3,404,024 A 10/1968 Lindemann
(Continued)

FOREIGN PATENT DOCUMENTS

EP 0453231 A2 10/1991
EP 0543552 A1 5/1993
(Continued)

OTHER PUBLICATIONS

Written Opinion of the International Searching Authority provided for PCT/EP2010/065434 (WO2011045380).*
(Continued)

*Primary Examiner* — Charles Capozzi
(74) *Attorney, Agent, or Firm* — Robert A. Ambrose

(57) ABSTRACT

There is described an apparatus and method for transporting contact lenses through dipping baths (2, 3, 4) for e.g. rinsing, extraction, coating or loading purposes. The lenses are individually accommodated in respective containers (5) which are capable of enabling a flow of treatment fluid (S) into and out of the container (5). During their automatic transport through the dipping baths (2, 3, 4) the containers (5) are held in carriers (6). Lifters (9) are provided for automatically lowering and raising the carriers (6) in a reciprocating manner along their travel through the dipping bath (2, 3, 4). The reciprocating lowering and raising of the containers (5) is accomplished such, that a portion of each container which accommodates a contact lens remains immersed in the treatment fluid (S) which is contained in the dipping bath (2, 3, 4) while the container (5) suspended from the carrier (6) is advanced through the dipping bath (2, 3, 4) from a starting end to a leaving end thereof.

20 Claims, 2 Drawing Sheets

Related U.S. Application Data

(60) Provisional application No. 61/252,498, filed on Oct. 16, 2009.

(51) Int. Cl.
*B05D 1/18* (2006.01)
*B05C 3/10* (2006.01)

(56) References Cited

U.S. PATENT DOCUMENTS

| | | | |
|---|---|---|---|
| 4,178,091 A * | 12/1979 | Solomon | G03D 3/10 134/149 |
| 4,184,927 A | 1/1980 | Takahashi et al. | |
| 4,381,285 A | 4/1983 | Wittenberg | |
| 4,966,672 A * | 10/1990 | Levit | C25D 17/28 118/423 |
| 5,080,839 A | 1/1992 | Kindt-Larsen | |
| 5,184,633 A | 2/1993 | Langford | |
| 5,219,533 A | 6/1993 | Larson | |
| 5,530,511 A | 6/1996 | Verlinden | |
| 5,836,323 A | 11/1998 | Keene et al. | |
| 5,952,161 A | 9/1999 | Earle | |
| 6,623,786 B2 | 9/2003 | Baron | |
| 6,827,779 B1 | 12/2004 | Marian | |
| 6,896,926 B2 | 5/2005 | Qui et al. | |
| 7,319,133 B2 | 1/2008 | Brame | |
| 7,629,436 B2 | 12/2009 | Brame | |
| 2003/0222362 A1 | 12/2003 | Indra | |
| 2005/0258096 A1 | 11/2005 | Stafford | |
| 2007/0035054 A1 | 2/2007 | Brame | |
| 2008/0103288 A1 | 5/2008 | Brame | |

FOREIGN PATENT DOCUMENTS

| | | |
|---|---|---|
| EP | 0649058 A1 | 4/1995 |
| EP | 0908771 A2 | 4/1999 |
| EP | 2018954 A2 | 1/2009 |
| FR | 2889976 A1 | 3/2007 |
| WO | 2005113028 A1 | 12/2005 |
| WO | 2007021612 A2 | 2/2007 |

OTHER PUBLICATIONS

PCT International Search Report dated Jan. 31, 2011, International Application No. PCT/EP2010/065434, International Filing Date Oct. 14, 2010.

PCT Written Opinion of the International Searching Authority dated Jan. 31, 2011, International Application No. PCT/EP2010/065434, International Filing Date Oct. 14, 2010.

\* cited by examiner

APPARATUS AND METHOD FOR TRANSPORTING CONTACT LENSES THROUGH DIPPING BATHS

This application is a division of U.S. patent application Ser. No. 12/904,179, filed Oct. 14, 2010 which claims the benefit under 35 U.S.C. §119(e) of United States provisional Application No. 61/252,498, filed on Oct. 16, 2009, each of which is incorporated by reference in its entirety.

FIELD

The invention relates to an apparatus for transporting contact lenses in dipping baths for treatments such as rinsing, extraction, coating or loading purposes. The invention also relates to a respective method for the transport of the contact lenses in or through dipping baths or processes.

BACKGROUND

It is well established in the art to produce hard and soft contact lenses in an automated production process with reusable moulds. Depending on the material from which the contact lenses are made, and in accordance with the production method applied the contact lenses must be immersed in extraction solutions, and/or rinsing solutions and/or coating solutions and/or loading solutions in order to obtain the desired lens product which may be worn in direct contact with a wearer's eyes. During these process steps it must be ascertained that the entire contact lens is sufficiently wetted and treated with the respective treatment fluid. The contact lenses are usually accommodated or held individually in respective containers and transported inside these containers through a number of dipping baths which are filled with the respective treatment fluid. In order to have the lenses properly wetted and treated it must be ascertained that the treatment fluid comes into contact with all sides of the contact lenses. Care must be taken that no portion of the contact lens is "shaded-off" by the walls of the container. The transport of the contact lenses through the dipping baths must be accomplished automatically, and the lenses must not be exposed to undue strain due to excessive agitation in order to avoid the risk of damage. The transport of the contact lenses through the dipping baths should be carried out smoothly, with the entire lens freely floating in the treatment fluid.

It is therefore an object of the present invention to provide an apparatus and a method for transporting contact lenses through dipping baths, while ensuring that the contact lenses are properly wetted and immersed in the respective treatment fluid. The apparatus and the method shall be compatible with the continuous production processes for contact lenses.

SUMMARY

These and still further objects are met by an apparatus for transporting contact lenses through dipping baths for treatment such as rinsing, extraction, coating or loading purposes which includes the features listed in claim 1. The objects are also met by a respective processing method which comprises the process steps listed in the respective independent method claim. Further improvements of the invention and preferred embodiments are subject of the respective dependent claims.

In accordance with one embodiment of the present invention, an apparatus for transporting contact lenses through dipping baths for treatment is disclosed. The apparatus includes a plurality of containers each for accommodating (i.e., holding within) one contact lens, the containers capable of enabling a flow of one or more treatment fluid into and out of the container, and a plurality of carriers to hold the containers during transport through the dipping baths, and further including lifters to automatically lower and raise the carriers in a reciprocating manner along a transport path through the dipping baths, such that a portion of each container which holds a contact lens remains immersed in the treatment fluid contained in the dipping bath while the container held by the carrier is transported through the dipping baths from a starting end to a leaving end thereof.

The contact lenses are transported through the dipping baths in a translational movement which is superimposed by a lowering and raising motion. During these superimposed manipulations that portion of the containers in which the contact lenses are accommodated or held is always completely immersed in the treatment fluid. Thus, the contact lenses are constantly agitated by treatment fluid streaming into and out of the container. Due to this agitation the contact lenses do not rest against a surface of the container but rather are held in suspension in the treatment liquid. Thus, it is ensured that all sides of the contact lenses are properly wetted by the treatment fluid. The treatment fluid is continuously streaming into and out of the container accommodating a lens. Thus, it is constantly being exchanged and the contact lens is exposed to fresh treatment fluid. The streaming velocity of the treatment fluid, however, is low enough to avoid an excessive agitation of the contact lens, so that it is not affected in a negative manner.

For constructive reasons it proves advantageous if the lifters that reciprocatingly lower and raise the carriers are mounted at the longitudinal sides of a housing of each dipping bath. The housings of the dipping baths usually are of a rectangular shape, having a certain depth. The longitudinal sides of the housings provide enough space for mounting the lifters and are easily accessible.

In an effective embodiment of the apparatus the lifters comprise a guide bar at each longitudinal side of the housing of a dipping bath. The guide bars slidingly support the longitudinal ends of the carriers, in which the containers accommodating the contact lenses are held.

At their supporting faces the guide bars each are provided with a longitudinally extending groove. Cams provided at the longitudinal ends of the carriers are accommodated in these grooves. Thus, the carriers are secured against an axial dislocation.

In order to provide the desired vertical movement of the guide bars they are each connected with a lever which is reciprocatingly lowered and raised. The levers extend about vertically at the longitudinal sides of the housings of the dipping baths.

For having the levers reciprocatingly lowered and raised they are connected with an electric drive. The stroke of the vertical movement of the levers is adjustable. Thus, depending on the size of the containers in which the contact lenses are transported, the lever may be lowered and raised different distances.

It proves convenient and sufficient for the usually applied sizes of the containers if the stroke of the levers is adjustable in between 2 mm to 20 mm, preferably 6 mm to 15 mm, most preferred 10 mm to 12 mm.

In one embodiment of the apparatus the electric drive is controlled for a continuous revolution and the stroke is mechanically adjustable. In an alternative embodiment of the apparatus the stroke of the levers is adjustable by control of a degree of a reciprocating forward and backward revolution of the electric drive. This last embodiment enables a very fast and effective control of the stroke. The first embodiment with mechanical adjustment allows the application of simpler control means for the electric drive. On the other hand though, the mechanical adjustment is less convenient.

The transport of the carriers through each dipping bath is accomplished by endless conveyor belts or chains which are provided at the longitudinal sides of the housing of the dipping bath. Along their circumference the conveyor belts or chains are equipped with pusher dogs that protrude from the surface. The longitudinal ends of the carriers each are placed in between two protruding pusher dogs. The length of the pusher dogs is greater than the stroke of the vertical movement of the carriers.

The transport of the contact lenses through each dipping bath may be accomplished in a continuous manner or stepwise. In a stepwise transport the transversal movement of the carriers and the vertical lowering and raising thereof are accomplished sequentially.

In dipping bath processes, e.g. for rinsing, extraction, coating or loading of the contact lenses, for the avoidance of dilution and contamination it may be advantageous if sequential arrangements of a number of dipping baths with the same treatment fluid are provided. In such cases the carriers holding the containers with the contact lenses must be transported from one dipping bath to the next one. For that purpose the apparatus according to the invention further comprises an automatically operating transfer means for the carriers from one dipping bath to the next dipping bath along the transport path.

The transfer means is a pair of transversally spaced transfer wheels with starlike arranged radial slots for receiving the longitudinal ends of the carriers. The pairs of transfer wheels are provided integrally with the means for the superimposed translational and vertical movement of the carriers. The control of the respective drives is such, that at the starting end of a housing of a dipping bath the carriers are transferred to the conveyor belt or chain such, that the longitudinal ends of the carriers each are placed in between two successive pusher dogs. In the next step the carriers are transported on by the conveyor belts or chains before being lowered. At the leaving end of the housing the carriers are transferred into the radial slots of the transfer wheels.

For increasing the productivity each carrier along its length is adapted for receiving side by side a number of containers, each accommodating an individual contact lens. This allows the simultaneous treatment of a larger number of contact lenses disposed in containers that are arranged side by side. In an exemplary embodiment of the invention a single carrier may hold up to 14 containers, each accommodating a single contact lens.

In accordance with another embodiment of the present invention, a method for transporting contact lenses through dipping baths for treatment is disclosed. The method for transporting contact lenses through dipping baths includes the steps of individually accommodating contact lenses in respective containers which are capable of enabling a flow of one or more treatment fluids into and out of the container, holding the containers in carriers, advancing the containers through the dipping baths, subjecting the carriers for the containers to a reciprocating lowering and raising motion along the transport through the dipping baths, wherein a portion of each container which accommodates a contact lens remains immersed in the treatment fluid contained in the dipping bath while the container held by the carrier is transported through the dipping baths from a starting end to a leaving end thereof.

The contact lenses are transported through the dipping baths in a translational movement which is superimposed by a vertical lowering and raising motion. During these superimposed motions that portion of the containers in which the contact lenses are accommodated is always completely immersed in the treatment fluid. Thus, the contact lenses are constantly agitated by treatment fluid streaming into and out of the container. Due to this agitation the contact lenses do not rest against a surface of the container but rather are held in suspension in the treatment liquid. Thus, it is ensured that all sides of the contact lenses are properly wetted by the treatment fluid. By the agitation of the containers held in the carriers the treatment fluid is forced to continuously stream into and out of the container. Thus, it is constantly being exchanged and the contact lens in the container is exposed to fresh treatment fluid. The streaming velocity of the treatment fluid, however, is low enough to avoid an overly agitation of the contact lens, so that it is not effected in a negative manner.

At the starting end of a dipping bath the containers held in the carriers are first lowered from an upper position into the dipping bath. By this measure the contact lenses are raised from the bottom of the container and remain floating and suspended in the treatment fluid during the transport through the dipping bath.

The superimposed translational and vertical movement of the carriers is controlled such, that a transport path of the containers for the contact lenses follows approximately a sinus curve.

The transport of the carriers and the vertical movement thereof may be accomplished continuously. However, for a better control of the superimposed translational and vertical movements it proves advantageous if the translational transport of the containers held in the carriers through the dipping baths and the lowering and raising, respectively, thereof are accomplished sequentially.

In order to avoid overly diluting and a contamination of the treatment fluids from preceding to successive baths the contact lenses may be transported through a number of successively arranged dipping baths with treatment fluid. At the transition from one dipping bath to the next one the carriers holding the containers for the contact lenses are transferred such, that the containers due to gravity are suspended from the carriers with their bottoms extending approximately vertically towards the dipping baths. Thus, in the transfer means the longitudinal ends of the carriers are supported loosely such, that they may turn in accordance with the action of gravity.

These and still further features of the apparatus and the respective transport method will become apparent from the following description of an exemplary embodiment of the invention, reference being made to the drawings, which are not to scale, in which:

DETAILED DESCRIPTION

The following description of an exemplary embodiment of the invention is for illustrative purposes only and not intended for limitation of the scope of the invention.

Figure 1:
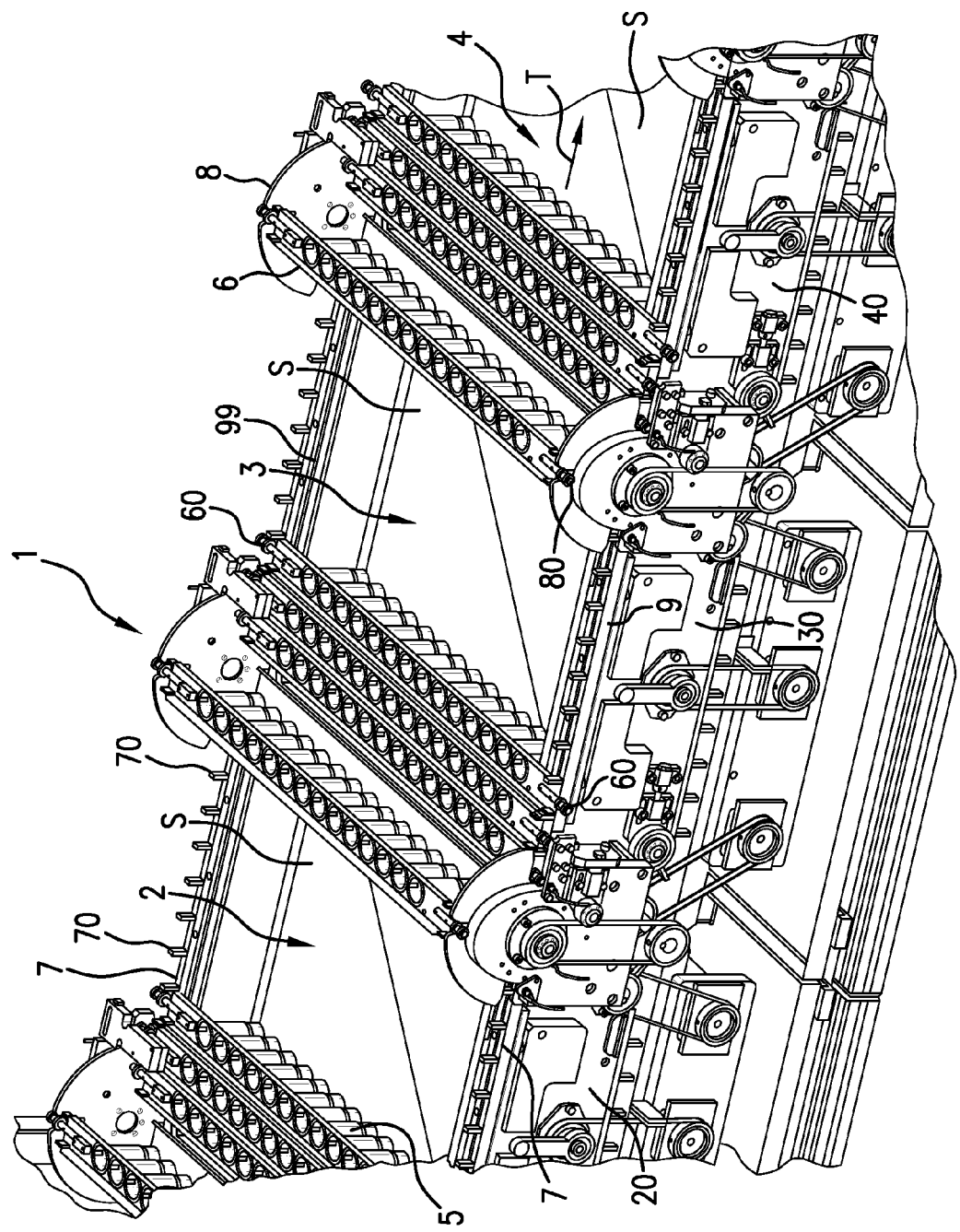
FIG. 1 is a perspective view from above of a dipping bath with a transport
i. apparatus.

FIG. 1 is an exemplary depiction of an apparatus or arrangement e.g. of successive dipping baths for rinsing, extraction, coating and/or loading of contact lenses during the fabrication process. The arrangement of dipping baths is generally designated with reference numeral 1. It comprises a number of successive dipping baths, three of which are designated with reference numerals 2, 3, and 4. The dipping baths 2, 3, 4 are, e.g., for lens rinsing, extraction, coating or loading purposes and contain the same kind of treatment fluid S in different concentrations inside basin-like housings 20, 30, and 40. A treatment fluid may suitably be one or more liquids or solutions used to treat the contact lens. The contact lenses are individually accommodated in tube-like containers 5 which are held in side by side relationship in carriers 6. The carriers 6 are transported along a transport path T through the dipping baths 2, 3, 4, with that portion of the containers 5, in which the contact lenses are accommodated, completely immersed in the treatment fluid S. For transporting the carriers 6 together with the containers 5 through the dipping baths 2, 3, 4 each dipping bath is provided at the sides of its respective housing with transport means. The transport means for the carriers are two parallel endless conveyor belts 7 which are provided with upright standing pusher dogs 70. The carriers 6 are placed onto the endless conveyor belts 7 such, that their longitudinal ends 60 are located in between two succeeding pusher dogs 70. The endless conveyor belt 7 is guided over pulleys. One of the pulleys is driven by an electric drive via a transmission belt.

At the start of each dipping bath and in between successive dipping baths there are provided transfer means for the carriers 6. The transfer means are a pair of transfer wheels 8 which are spaced from each other in a transversal direction and are located next to the side walls of the housings 20, 30, 40. The transfer wheels 8 are provided with radial slots 80 for receiving the longitudinal ends 60 of the carrier 6. The transfer wheels 8 are connected by an axle and electrically driven.

At the sides of the housings 20, 30, 40 of the dipping baths 2, 3, 4 there are provided lifters 9 for automatically lowering and raising the carriers 6 in a reciprocating manner along their transport through the dipping baths. The lifters 9 are electrically driven.

The control of the electric drives for the automatic transport means 7, the lifters 9 and the transfer means 8 are adjusted with respect to each other such, that during the transport across the dipping baths that portion of the containers 5, in which the contact lenses are accommodated, remain completely immersed in the treatment liquid, even as the carriers are raised by the lifters 9. The controls are further adjusted such, that the carriers 5 are securely transferred from the transfer means 8 to the transport means 7 at the starting end of a dipping bath, and at the leaving end of the dipping bath received by the slots 80 in the transfer wheels 8 of the transfer means 8 to the next dipping bath.

Figure 2:
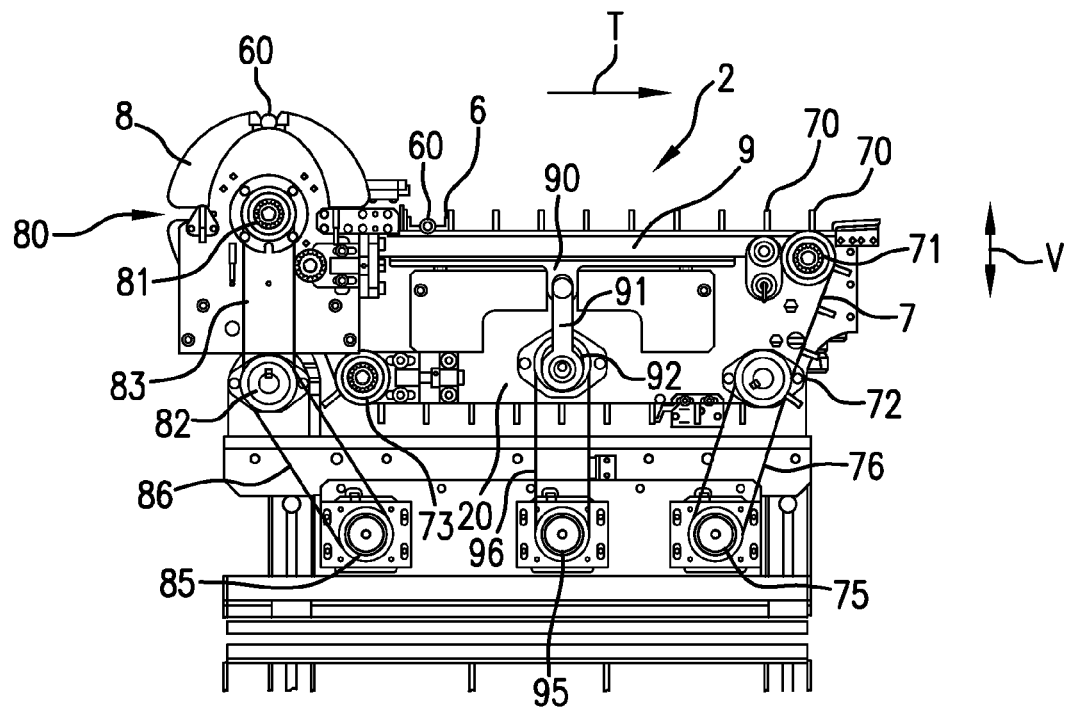
FIG. 2 is a side view of a dipping bath of FIG. 1 with the transport apparatus in
ii. the lowered position.
Figure 3:
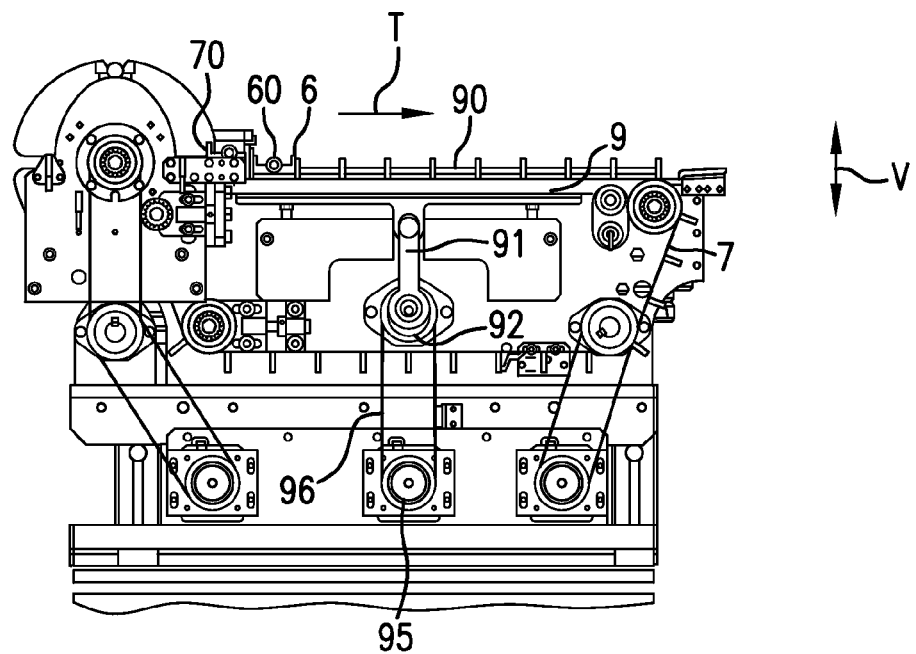
FIG. 3 is a side view of the dipping bath of FIG. 2 with the transport apparatus in
iii. the raised position.

FIGS. 2 and 3 show in greater detail one dipping bath of the arrangement of successive dipping baths 1 of FIG. 1, e.g. dipping bath 2. FIG. 2 shows the lifters 9 in the lowered position while FIG. 3 shows the lifters 9 in its raised position. The dipping bath 2 comprises a basin-like housing 20 in which the respective treatment fluid is contained. An endless conveyor belt 7 with protruding pusher dogs 70 is provided for the transport of the carriers 6, in which the containers for the contact lenses are held, through the dipping bath 2 in transport direction T. It is to be noted that instead of a conveyor belt also a conveyor chain may be used. The longitudinal ends of the carriers 6 are designated with reference numeral 60. The endless conveyor belt 7 is guided over pulleys 71, 72, 73. A fourth pulley is covered by a cover of the transfer means 8 at the starting end of the housing 20 of the dipping bath 2. One of the pulleys, for example according to FIG. 2 pulley 72, may be electrically driven. For that purpose an electric drive with a drive wheel 75 and a transmission belt 76 is provided.

The transfer means at the starting end of the housing 20 of the dipping bath comprise a pair of transfer wheels 8 with slots 80 for receiving the longitudinal ends 60 of the carriers. The slots 80 are dimensioned such, that the carriers 6 are capable of sliding into and out of them. In the slots 80 the longitudinal ends 60 of the carriers 6 are held freely such that they can turn in accordance to the force of gravity on the containers held in the carriers 6. Thus, it is ensured that the bottoms of the containers always are directed downwardly towards the dipping bath. One of the transfer wheels 8 of the transfer means is electrically driven. For that purpose there is provided an electric drive 85 with a transmission belt 86. According to FIG. 2 the transmission belt 86 drives an intermediate wheel 82, which is connected with another wheel 81 at the drive side of the transfer wheel 8 via another transmission belt 83.

The lifters for the carriers 6 is generally designated with reference numeral 9. It comprises a guide bar 90 at each longitudinal side of the housing 20 of the dipping bath 2. The guide bar 90 slidingly supports the longitudinal ends 60 of the carriers 6. At their supporting surfaces the guide bars 90 preferably are provided with longitudinally extending grooves (FIG. 1, reference numeral 99) for receiving corresponding cams (not shown) at the ends 60 of the carriers. The cams may be shaped e.g. as radially protruding flanges.

For reciprocatingly lowering and raising the guide bars 90 in accordance with the vertical directions double arrow V in FIG. 2, the guide bars are each connected with a lever 91 which is mounted on an excenter disk 92 provided at the longitudinal side of the housing 20. The excenter disk 92 is driven by an electric drive with drive wheel 95 via a transmission belt 96. By control of a reciprocating forward and backward revolution of the electric drive the degree of lowering and raising of the guide bars 90 may be controlled. Thus, rather than mechanically, the stroke of the lifters 9 is adjusted electronically. It is to be noted though, that the electric drive may be a continuous one and the adjustment of the stroke may be accomplished mechanically. In the exemplary embodiment of the invention the stroke of the lifters may be adjustable from about 2 mm to about 20 mm. In other embodiments, the stroke of the lifters may desirably be adjustable from about 6 mm to about 15 mm, while in others the stroke may desirably be adjustable from about 10 mm to about 12 mm.

In FIG. 3 the lifter 9 is shown in its raised position. Like reference numerals designate like elements as in FIG. 2. With the lifters 9 in their raised position the guide bars 90 extend beyond the conveyor belt 7. The length of the pushing dogs 70 on the conveyor belt 7, however, is longer than the maximum stroke of the lifters 9. Thus, it is ensured that the longitudinal ends 60 of the carriers 6 remain in engagement with the pushing dogs 70 protruding from the conveyor belt 7.

In operation the containers suspended from the carriers 6 are first lowered into the dipping bath 2 in order to ensure that the current of the agitated treatment fluid entering the containers keeps the contact lens within each container floating. Upon further transport through the dipping bath in transport direction T the carriers are reciprocatingly raised and lowered which is indicated by the double arrow V. The transport of the contact lenses in the containers through the dipping bath 2 and the reciprocating lowering and raising motion may be accomplished simultaneously. In an alternative embodiment of the invention the lowering and raising motion and the transport movement may be accomplished stepwise, with the containers first being lowered, then transported on, then raised again, then transported on, then lowered, etc. Ideally, with the superimposed translational and vertical movements, the transport path of the containers through the dipping bath 2 follows a path similar to the path approximated by a sinus curve.

The invention claimed is:

1. An apparatus for transporting contact lenses through dipping baths, the apparatus comprising a plurality of containers each for accommodating one contact lens, the containers capable of enabling a flow of one or more treatment fluid into and out of each container, and a plurality of carriers to hold the containers during transport through the dipping baths, and further comprising lifters to automatically lower and raise the carriers in a reciprocating manner along a transport path through the dipping baths, such that a portion of each container which holds a contact lens remains immersed in a treatment fluid contained in each dipping bath while the container held by a carrier is transported through the respective dipping baths from a starting end to a leaving end thereof;
wherein the lifters are mounted at longitudinal sides of a housing of each dipping bath, the lifters comprise a guide bar at each longitudinal side of the housing of the dipping bath for slidingly supporting longitudinal ends of the carriers, and the guide bars at their supporting faces each are provided with a longitudinally extending groove for accommodating a corresponding cam at each longitudinal end of the carriers.

2. The apparatus according to claim 1, wherein the guide bars each are connected with a lever which is capable of being reciprocatingly lowered and raised.

3. The apparatus according to claim 2, wherein the levers are connected with an electric drive and are reciprocatingly lowered and raised with a stroke which is adjustable.

4. The apparatus according to claim 3, wherein the stroke is adjustable from 2 mm to 20 mm.

5. The apparatus according to claim 4, wherein the stroke is adjustable from 6 mm to 15 mm.

6. The apparatus according to claim 3, wherein the electric drive is controlled for a continuous revolution and the stroke is mechanically adjustable.

7. The apparatus according to claim 3, wherein the stroke of the levers is adjustable by control of a degree of a reciprocating forward and backward revolution of the electric drive.

8. The apparatus according to claim 1, further comprising an automatically operating transfer means for transferring the carriers from one dipping bath to the next dipping bath along the transport path.

9. The apparatus according to claim 8, wherein the transfer means is a pair of transversally spaced transfer wheels with radial slots for receiving longitudinal ends of the carriers.

10. An apparatus for transporting contact lenses through dipping baths, the apparatus comprising a plurality of containers each for accommodating one contact lens, the containers capable of enabling a flow of "one or more treatment fluid into and out of each container", and a plurality of carriers to hold the containers during transport through the dipping baths, and further comprising lifters to automatically lower and raise the carriers in a reciprocating manner along a transport path through the dipping baths, such that a portion of each container which holds a contact lens remains immersed in a treatment fluid contained in each dipping bath while the container held by a carrier is transported through the respective dipping baths from a starting end to a leaving end thereof, wherein the lifters are mounted at longitudinal sides of a housing of each dipping bath, and wherein each carrier along its length is adapted for receiving side by side a number of containers, each accommodating an individual contact lens.

11. The apparatus according to claim 10, wherein the lifters comprise a guide bar at each longitudinal side of the housing of a dipping bath for slidingly supporting longitudinal ends of the carriers.

12. The apparatus according to claim 11, wherein the guide bars at their supporting faces each are provided with a longitudinally extending groove for accommodating a corresponding cam at each longitudinal end of the carriers.

13. The apparatus according to claim 12, wherein the guide bars each are connected with a lever which is capable of being reciprocatingly lowered and raised.

14. The apparatus according to claim 13, wherein the levers are connected with an electric drive and are reciprocatingly lowered and raised with a stroke which is adjustable.

15. The apparatus according to claim 14, wherein the stroke is adjustable from 2 mm to 20 mm.

16. The apparatus according to claim 15, wherein the stroke is adjustable from 6 mm to 15 mm.

17. The apparatus according to claim 14, wherein the electric drive is controlled for a continuous revolution and the stroke is mechanically adjustable.

18. The apparatus according to claim 14, wherein the stroke of the levers is adjustable by control of a degree of a reciprocating forward and backward revolution of the electric drive.

19. The apparatus according to claim 18, further comprising an automatically operating transfer means for transferring the carriers from one dipping bath to the next dipping bath along the transport path.

20. The apparatus according to claim 19, wherein the transfer means is a pair of transversally spaced transfer wheels with radial slots for receiving longitudinal ends of the carriers.

* * * * *